US008024804B2

(12) United States Patent
Shulman et al.

(10) Patent No.: US 8,024,804 B2
(45) Date of Patent: Sep. 20, 2011

(54) CORRELATION ENGINE FOR DETECTING NETWORK ATTACKS AND DETECTION METHOD

(75) Inventors: Amichai Shulman, Givataim (IL); Mickey Boodaei, Givataim (IL); Shlomo Kremer, Tel-Aviv (IL)

(73) Assignee: Imperva, Inc., Foster City, CA (US)

( * ) Notice: Subject to any disclaimer, the term of this patent is extended or adjusted under 35 U.S.C. 154(b) by 976 days.

(21) Appl. No.: 11/369,733

(22) Filed: Mar. 8, 2006

(65) Prior Publication Data

US 2007/0214503 A1 Sep. 13, 2007

(51) Int. Cl.
*G06F 12/14* (2006.01)

(52) U.S. Cl. ............................................. 726/23; 726/13

(58) Field of Classification Search ........................ None
See application file for complete search history.

(56) References Cited

U.S. PATENT DOCUMENTS

| 7,237,267 | B2* | 6/2007 | Rayes et al. | 726/25 |
| 7,346,922 | B2* | 3/2008 | Miliefsky | 726/3 |
| 7,363,656 | B2* | 4/2008 | Weber et al. | 726/23 |
| 7,640,235 | B2 | 12/2009 | Shulman et al. | |
| 7,743,420 | B2 | 6/2010 | Shulman et al. | |
| 7,752,662 | B2 | 7/2010 | Shulman et al. | |
| 2002/0059528 | A1* | 5/2002 | Dapp | 713/201 |
| 2002/0147925 | A1* | 10/2002 | Lingafelt et al. | 713/201 |
| 2003/0046577 | A1* | 3/2003 | Silverman | 713/200 |
| 2003/0084326 | A1* | 5/2003 | Tarquini | 713/200 |
| 2003/0188189 | A1* | 10/2003 | Desai et al. | 713/201 |
| 2004/0044912 | A1* | 3/2004 | Connary et al. | 713/201 |
| 2004/0103021 | A1 | 5/2004 | Scarfe et al. | |
| 2004/0111638 | A1* | 6/2004 | Yadav et al. | 713/201 |
| 2004/0199791 | A1* | 10/2004 | Poletto et al. | 713/201 |
| 2004/0205360 | A1* | 10/2004 | Norton et al. | 713/201 |
| 2005/0071642 | A1 | 3/2005 | Moghe et al. | |
| 2005/0120054 | A1* | 6/2005 | Shulman et al. | 707/104.1 |
| 2005/0169282 | A1* | 8/2005 | Wittman | 370/401 |
| 2005/0188215 | A1* | 8/2005 | Shulman et al. | 713/188 |
| 2006/0179296 | A1* | 8/2006 | Bartlett et al. | 713/152 |
| 2006/0191008 | A1* | 8/2006 | Fernando et al. | 726/23 |
| 2006/0253903 | A1* | 11/2006 | Krumel | 726/13 |
| 2006/0272008 | A1 | 11/2006 | Shulman et al. | |
| 2006/0288411 | A1* | 12/2006 | Garg et al. | 726/22 |
| 2007/0058540 | A1* | 3/2007 | Kay | 370/230 |
| 2007/0086338 | A1* | 4/2007 | Robert et al. | 370/230 |
| 2007/0124806 | A1 | 5/2007 | Shulman et al. | |

(Continued)

OTHER PUBLICATIONS

Gartner IT Security Summit, Imperva Delivers First True Gigabit Application Firewall Solution, News & Events, Press Release, http://web.archive.org/web/20060312094936/www.imperva.com/company/news/2005-jun-06.html, Imperva Inc., Jun. 6, 2005, pp. 3, Washington, DC, USA.

(Continued)

*Primary Examiner* — Nathan Flynn
*Assistant Examiner* — Michael R Vaughan
(74) *Attorney, Agent, or Firm* — Sughrue Mion, PLLC (57) ABSTRACT

A method for detecting network attacks is provided. In one implementation, the method receives a plurality of attack indications based on data transmitted on the network and applies rules to the plurality of attack indications. Also, the method generates an alert if an application of at least a subset of the rules on the plurality of attack indications indicates a potential attack. In addition, a network device that performs the method and a computer program corresponding to the method are provided.

47 Claims, 6 Drawing Sheets

U.S. PATENT DOCUMENTS

| | | | |
|---|---|---|---|
| 2007/0136312 A1* | 6/2007 | Shulman et al. | 707/10 |
| 2007/0136809 A1* | 6/2007 | Kim et al. | 726/22 |
| 2007/0157312 A1* | 7/2007 | Joubert et al. | 726/22 |
| 2007/0294539 A1 | 12/2007 | Shulman et al. | |
| 2008/0022405 A1* | 1/2008 | Wang et al. | 726/23 |
| 2008/0065640 A1 | 3/2008 | Shulman et al. | |
| 2008/0320567 A1 | 12/2008 | Shulman et al. | |
| 2009/0070459 A1* | 3/2009 | Cho et al. | 709/224 |
| 2009/0172815 A1* | 7/2009 | Gu et al. | 726/23 |
| 2010/0251377 A1 | 9/2010 | Shulman et al. | |

OTHER PUBLICATIONS

Imperva SecureSpehre™ Data Security Solutions, Products, SecureSpere, http://web.archive.org/web/20060312093140/www.imperva.com/products/securesphere/, Imperva Inc, 2006, p. 1.

Imperva Inc., SecureSpehre™ Web Application Firewall the Industry's Only Automated Web Application Firewall, Products, Resources, Database, SecureSphere Web Application Firewall Datasheet, http://web.archive.org/web/20060312092739/www.imperva.com/products/securesphere/resources.asp, 2006, pp. 4.

Imperva Inc., Imperva SecureSpehre™ Dynamic Profiling Firewall, Product, SecureSphere, http://web.archive.org/web/20050207181514/www.imperva.com/products/securesphere/, 2005, pp. 2.

Imperva Inc., Imperva Delivers Unique Security Insight into Applications in Production, News & Events, Press Releases, New Release of SecureSphere Extends the Reach of Innovative Dynamic Profiling Technology, http://web.archive.org/web/20050207165342/www.imperva.com/company/news/2004-dec-13.html, Dec. 13, 2004, pp. 3, Foster City, California, USA.

Imperva Inc., Web and Database Firewalls, Products, SecureSpere™, Dynamic Profiling, http://web.archive.org/web/20041224083525/www.imperva.com/products/securesphere/web_database_firewalls.html, 2004, pp. 2. Imperva Inc., Ready to take a test drive?, Products, SecureSpere™, Demo, http://web.archive.org/web/20041224085514/www.imperva.com/products/securesphere/demo.html, 2005, pp. 2.

Imperva Inc., Freeware IT security test tools, Application Defense Center, tools, http://web.archive.org/web/20041223174325/www.imperva.com/application_defense_center/tools.asp, 2005, p. 1.

Imperva Inc., Products, SecureSpehre™, White Papers, http://web.archive.org/web/20041224085413/www.imperva.com/products/securesphere/white_papers.asp, 2005, pp. 2.

Imperva Inc., Traditional Web Application Security vs. SecureSphere, A comparison of Hard Trigger Rules vs. Correlated Attack Validation, 2004, pp. 10.

Imperva Inc., Imperva™ SecureSphere™ Technical Description, 2004, pp. 20.

Imperva Inc., Imperva Unveils Next Generation Firewall Technology: Dynamic Profiling, SecureSphere 3.0 Delivers Total Application Security from Web, Worm and Database Threats, About Us, Press Releases, http://web.archive.org/web/20041015225044/www.imperva.com/company/news/2004-aug-23.html, Aug. 23, 2004, pp. 2, Foster City, California, USA.

Imperva Inc., Management & Reporting, http://web.archive.org/web/20041023204255/www.imperva.com/products/securesphere/management_reporting.html, Sep. 26, 2004, p. 1, vol. 3.0.

Imperva Inc., Imperva™ SecureSphere™ Securing the Enterprise Application Sphere, Apr. 1, 2004, pp. 2, vol. 2.0.

Imperva Inc., SecureSphere™ Dynamic Profiling Firewall Total Application Security, Products, SecureSphere™, Database, SecureSphere Datasheet, http://web.archive.org/web/20041215173241/www.imperva.com/products/securesphere/datasheet.html, 2004, pp. 4.

Imperva Inc., SecureSphere™ Dynamic Profiling Firewall Total Application Security, 2004, pp. 4.

Imperva Inc., Total Application Security with the SecureSphere Dynamic Profiling Firewall, http://www.infotechits.com/IT_Solutions/SecureSphere/securesphere_white_paper.pdf, 2004, pp. 1-10.

* cited by examiner

CORRELATION ENGINE FOR DETECTING NETWORK ATTACKS AND DETECTION METHOD

FIELD OF ILLUSTRATIVE EMBODIMENTS OF THE INVENTION

Illustrative, non-limiting embodiments of the present invention generally relate to application level security systems for detecting network attacks, in real time, and to the methods that the systems perform. In a more specific implementation, embodiments of the present invention relate to security systems and methods that reduce the number of falsely detected network attacks.

BACKGROUND OF ILLUSTRATIVE EMBODIMENTS OF THE INVENTION

In recent years, the Internet rapidly has changed the way that people access information. The World Wide Web ("WWW" or "Web") is the most popular manner in which people access and retrieve information via the Internet, and the Web enables users to access a vast number of resources from locations all around the world. In addition, businesses, enterprises, and other organizations can use software applications or "Web applications" to provide information to others via the Web and to conduct business and other transactions over the Web.

As web-based front ends continue to expand traditional web applications, an ever-growing amount of information, which is stored in corporate databases, is becoming available on the Web. While increasing the availability of this information has extended the business practices of many organizations beyond their traditional boundaries, it also increases the amount of sensitive information that is available to a growing number of employees, business partners, suppliers, on-line customers, etc.

As such, many businesses and other organizations have become weary of the vulnerability of their Web applications, databases, and sensitive information to attacks from malicious, irresponsible, or criminally-minded individuals or organizations. These organizations have heavily invested in security, such as anti-virus software and firewalls, so that they can prevent these attacks and safely use the Web. Particularly, organizations have deployed application level security systems to protect their Web applications and information.

Application level security systems have generally prevented attacks by restricting the network level access to the Web applications based on the applications' attributes. For example, these security systems may constantly monitor and gather requests received at interfaces and at various application components, correlate the application requests, and compare them with predetermined application profiles. These profiles include application attributes, such as uniform resource locators ("URLs"), cookies, user information, Internet protocol ("IP") addresses, structured query language ("SQL") query statements, and many others. These attributes determine the normal behavior of the protected application. If one or more application requests do not match the application profile, a security system may generate an "irregular" event and, in turn, generate an alert identifying a potential attack.

One disadvantage of these security systems is that they generate an alert identifying a potential attack based only on a single irregular event. As a result, the systems generate a relatively high number of false alarms, which reduces the accuracy and efficiency of the systems and which reduces their ability to protect the Web applications and sensitive information.

SUMMARY OF ILLUSTRATIVE EMBODIMENTS OF THE INVENTION

Illustrative, non-limiting embodiments of the present invention overcome various disadvantages. In addition, the present invention is not required to overcome these disadvantages, and an illustrative, non-limiting embodiment of the present invention may not overcome any problems.

An illustrative, non-limiting embodiment of the invention corresponds to a method for detecting network attacks. In one implementation, the method comprises: (a) receiving a plurality of attack indications based on data transmitted on the network; (b) applying rules to the plurality of attack indications; and (c) generating an alert if an application of at least a subset of the rules on the plurality of attack indications indicates a potential attack.

Another illustrative, non-limiting embodiment of the invention corresponds to a software program, which is contained on a computer-readable medium and which is capable of instructing a computer to perform a routine for detecting network attacks. In one example, routine comprises: (a) receiving a plurality of attack indications based on data transmitted on the network; (b) applying rules to the plurality of attack indications; and (c) generating an alert if an application of at least a subset of the rules on the plurality of attack indications indicates a potential attack.

Still another illustrative, non-limiting embodiment of the invention corresponds to a network device that detects network attacks. In one implementation, the device comprises: a network sensor that receives data transmitted on the network and that generates a plurality of attack indications based on the data; and a first correlation engine that applies a first set of rules to the plurality of attack indications and that generates a first alert if an application of at least a subset of the first set of rules on the plurality of attack indications indicates a first potential attack.

Additional aspects and advantages of illustrative embodiments of the invention will be set forth, in part, in the description that follows or may be learned by practice of the embodiments. The aspects and advantages of the embodiments may be realized and attained by means of the instrumentalities and combinations particularly pointed out in the appended claims.

BRIEF DESCRIPTION OF THE DRAWINGS

The above and other features and advantages of illustrative, non-limiting embodiments of the present invention will become more apparent from the following description. The accompanying drawings, which are incorporated into and constitute a part of this specification, illustrate exemplary embodiments of the invention and, together with the description, serve to explain the aspects, advantages and principles of the embodiments. In the drawings.

DETAILED DESCRIPTION OF THE ILLUSTRATIVE, NON-LIMITING EMBODIMENTS OF THE INVENTION

Figure 1:
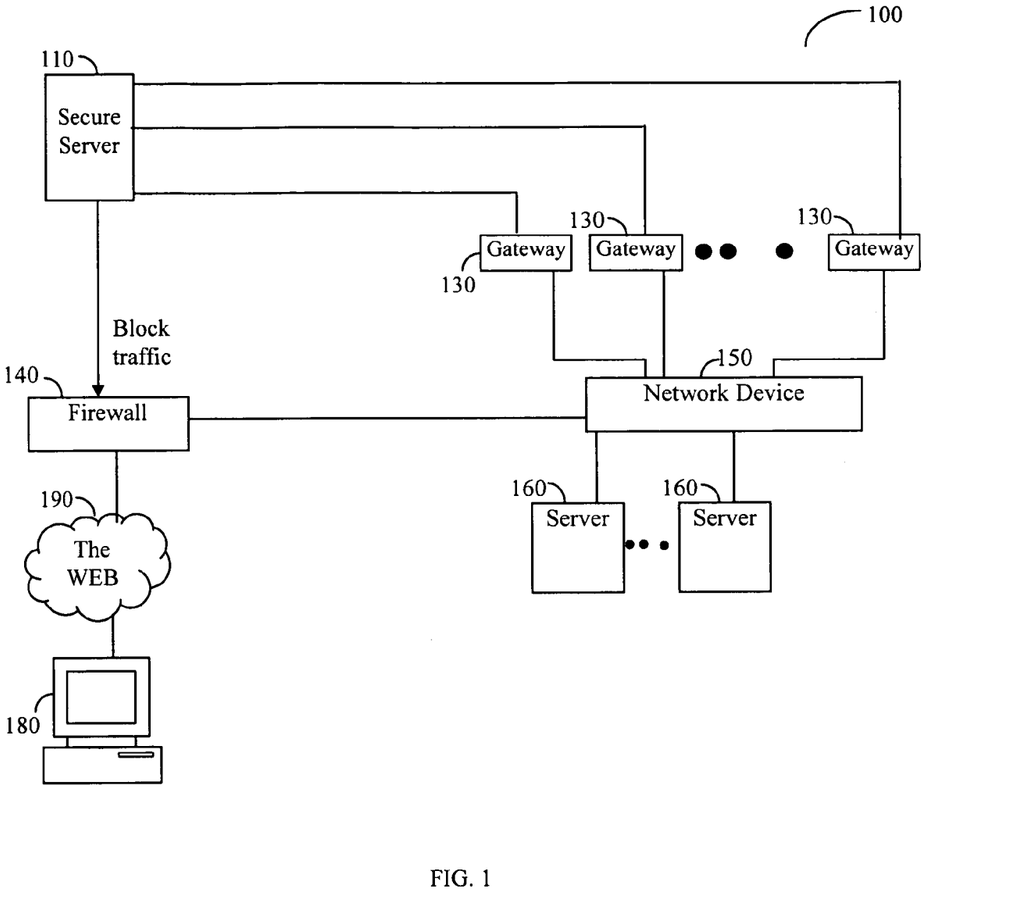
FIG. 1 shows an illustrative, non-limiting embodiment of an application level security system.

FIG. 1 shows an illustrative, non-limiting embodiment of an application level security system 100. The security system 100 is capable of detecting and blocking web attacks by correlating various indicators, such as irregular events, anomalies or a combination thereof. In one implementation, the security system 100 comprises a plurality of secure gateways 130 connected to a secure server 110. The gateways 130 may be connected to the server 110 via an out-of-band network (not shown) that transfers information over a dedicated and secure network that is completely separate from the production traffic. As shown in the figure, at least one of the gateways 130 is coupled to a network device 150 that includes servers 160 to be protected from attacks. The production traffic may include data that is accessible via the Web 190 and may flow from the gateways 130 to the client 180 via the network device 150, a firewall 140, and the Web 190, and vice versa. In one embodiment, these servers 160 may include, without limitation, Web servers and/or database servers.

In addition, the security system 100 is a "non-intrusive" system. As such, each of the secure gateways 130 operates in a line or flow of traffic of information, and the information passes directly through the secure gateway 130 to the protected server or servers 160.

Figure 2:
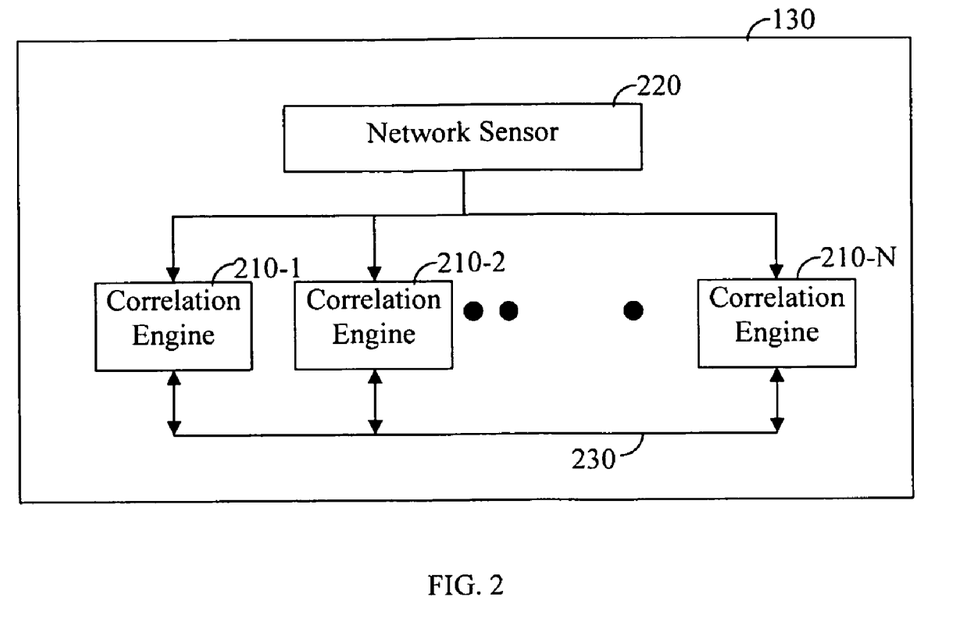
FIG. 2 shows an illustrative, a non-limiting embodiment of a gateway contained in the security system shown in FIG. 1.

FIG. 2 shows an illustrative, non-limiting embodiment of the detailed structure of one of the secure gateways 130 shown in FIG. 1. As shown, the secure gateway 130 comprises a plurality of correlation engines 210-1 to 210-N and a network sensor 220.

In one implementation, each of the engines 210-1 to 210-N is capable of detecting a certain type of a web attack. For example, the engine 210-1 may detect directory traversal web attacks, and the engine 210-2 may detect cross-site scripting ("XSS") web attacks. Also, the engines 210-1 to 210-N may detect other types of web attacks instead of, or in addition to, the above two types of attacks. For example, the types of web attacks that the engines 210-1 to 210-N may detect include, without limitation, automatic reconnaissance attacks, search engine hacking attacks, application denial of service ("DoS") attacks, etc.

In addition, in the present example, the network sensor 220 gathers information from the network traffic and processes the information to reconstruct events. For instance, the network sensor 220 may comprise a hypertext transfer protocol ("HTTP") sensor that collects HTTP requests, which a client sends to a Web server, and that reconstructs HTTP events. In another implementation, the sensor 220 may comprise an SQL sensor that collects SQL requests sent to a database server and reconstructs SQL events. Moreover, the network sensor 220 is not limited to an HTTP or SQL sensor and may include other types of sensors.

The sensor 220 may also process the HTTP, SQL, or other requests and detect abnormal behavior or anomalies in the requests. For instance, the network sensor 220 may generate an anomaly indication if a request deviates from a normal behavior profile or deviates from an application layer protocol (e.g., an HTTP, SQL, or other protocol).

Each of the correlation engines 210-1 to 210-N inputs "attack indications." The attack indications may include (1) the anomalies and events from the sensor 220, (2) events that an external network sensor (from, for example, another gateway 130) produces, (3) alerts that another one of the correlation engines 210-1 to 210-N produces, or (4) any combination of items (1) to (3).

After inputting the attack indications, each correlation engine 210-1 to 210-N applies a set of correlation rules to the attack indications to detect a potential attack. The rules that a particular correlation engine 210 applies correspond to the particular type of attack that the engine 210 is designed to detect. For example, if the engine 210-1 is designed to detect directory traversal web attacks, it may have a first set of rules, and if the engine 210-2 is designed to detect XSS web attacks, it may have a second set of rules. When one of the correlation engines 210-1 to 210-N (e.g., the engine 210-1) detects a potential attack, it generates an alert and sends the alert to the secure server 110 and to the other correlation engines 210-2 to 210-N via a common bus 230.

Figure 3:
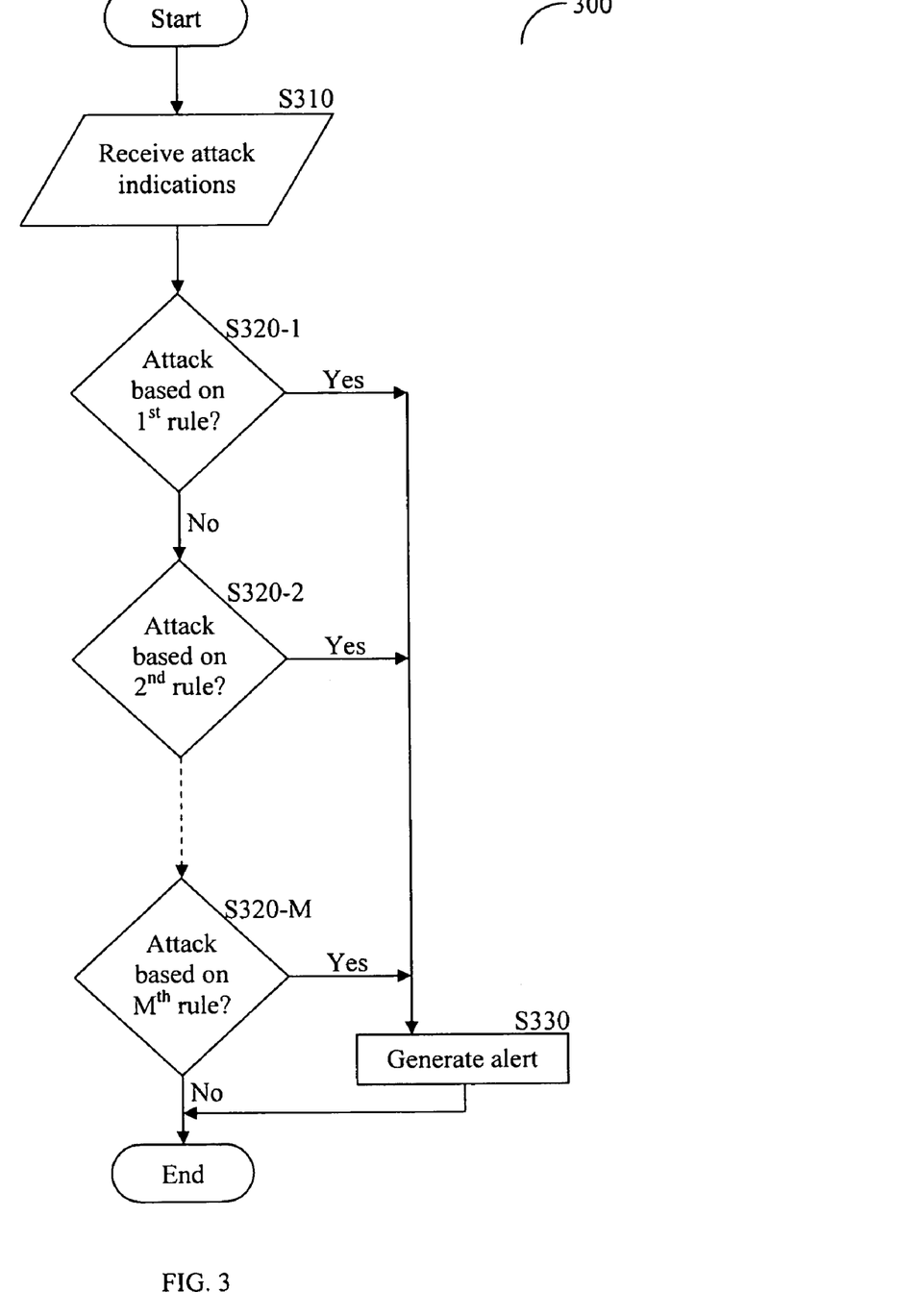
FIG. 3 shows an illustrative, non-limiting embodiment of a process for detecting web attacks.

FIG. 3 shows an illustrative, non-limiting embodiment of a general process 300 that one of the correlation engines 210-1 to 210-N (e.g., the engine 210-1) performs to detect web and database attacks. As shown in the figure, the correlation engine 210-1 receives attack indications, and the engine 210-1 attempts to correlate the attack indications at three different levels. (Operation S310).

As one example, at the first level, the engine 210-1 correlates anomalies that result from the same single event. At the second level, the engine 210-1 correlates anomalies that originated from a sequence of events of the same type. At the third level, the engine 210-1 correlates two different types of events. In any of the above correlations, the correlation engine 210-1 may be an input alert from another correlation engine 210-2 to 210-M as an attack indication.

Subsequently, the engine 210-1 processes up to M independent rules based on the attack indications. In particular, as shown in FIG. 3, the engine 210-1 processes a first rule based on the attack indications and determines if a potential attack exists based on the first processing result. (Operation S320-1). If a potential attack exists (operation S320-1: Yes), the engine 210-1 generates an alert. (Operation S330). On the other hand, if the first processing result does not indicate that a potential attack exists (operation S320-1: No), the engine 210-1 processes a second rule based on the attack indications and determines whether or not a potential attack exists based on the second processing result. (Operation S320-2). If a potential attack exists (operation S320-2: Yes), the engine 210-1 generates an alert. (Operation S330). However, if the second processing result does not indicate that a potential attack exists (operation S320-2: No), the engine 210-1 processes the next rule based on the attack indications.

If the engine 210-1 does not generate an alert (operation 330) as a result of processing the $(M-1)^{th}$ rule, it processes an $M^{th}$ rule based on the attack indications and determines whether or not a potential attack exists based on the $M^{th}$ processing result. (Operation S320-M). If a potential attack exists (operation S320-M: Yes), the engine 210-1 generates an alert. (Operation S330). On the other hand, if the $M^{th}$ processing result does not indicate that a potential attack exists (operation S320-M: No), the engine 210-1 determines that the incoming request is not a potential attack, and the process ends.

In the process shown in FIG. 3, the correlation engine 210-1 may determine that a potential attack exists only if the attack indications satisfy one of the rules and may determine that a potential attack exists only if the attack indications do not satisfy another one of the rules. For example, when the engine 210-1 processes the first rule (operation S320-1), it may determine that a potential attack exists (operation S320-1: Yes) only when the first rule is satisfied. On the other hand, when the engine 210-1 processes the second rule (operation S320-2), it may determine that a potential attack exists (operation S320-2: Yes) only when the second rule is not satisfied. Also, the order in which the engine 210-1 processes the first to $M^{th}$ rules is determined according to the type of attack that the engine 210-1 is designed to detect.

In the non-limiting example shown in FIG. 3, the correlation engine 210-1 must process all of the first to $M^{th}$ rules before concluding that the incoming request is not a potential attack. However, the correlation engine 210-1 performs a process that enables it to determine that the request is a potential attack by processing less than M rules.

One skilled in the art will appreciate that, by correlating attack indications using a set of independent rules, the correlation engine 210-1 accurately determines whether or not a potential attack exists and that the engine 210-1 is able to provide better and more efficient protection. Moreover, by progressively processing the rules in order, as in the process shown in FIG. 3, the engine 210-1 is typically able to identify potential attacks by processing less than M rules. Therefore, the engine 210-1 can quickly identify such attacks, and the processing time of the engine 210-1 is reduced.

Figure 4A:
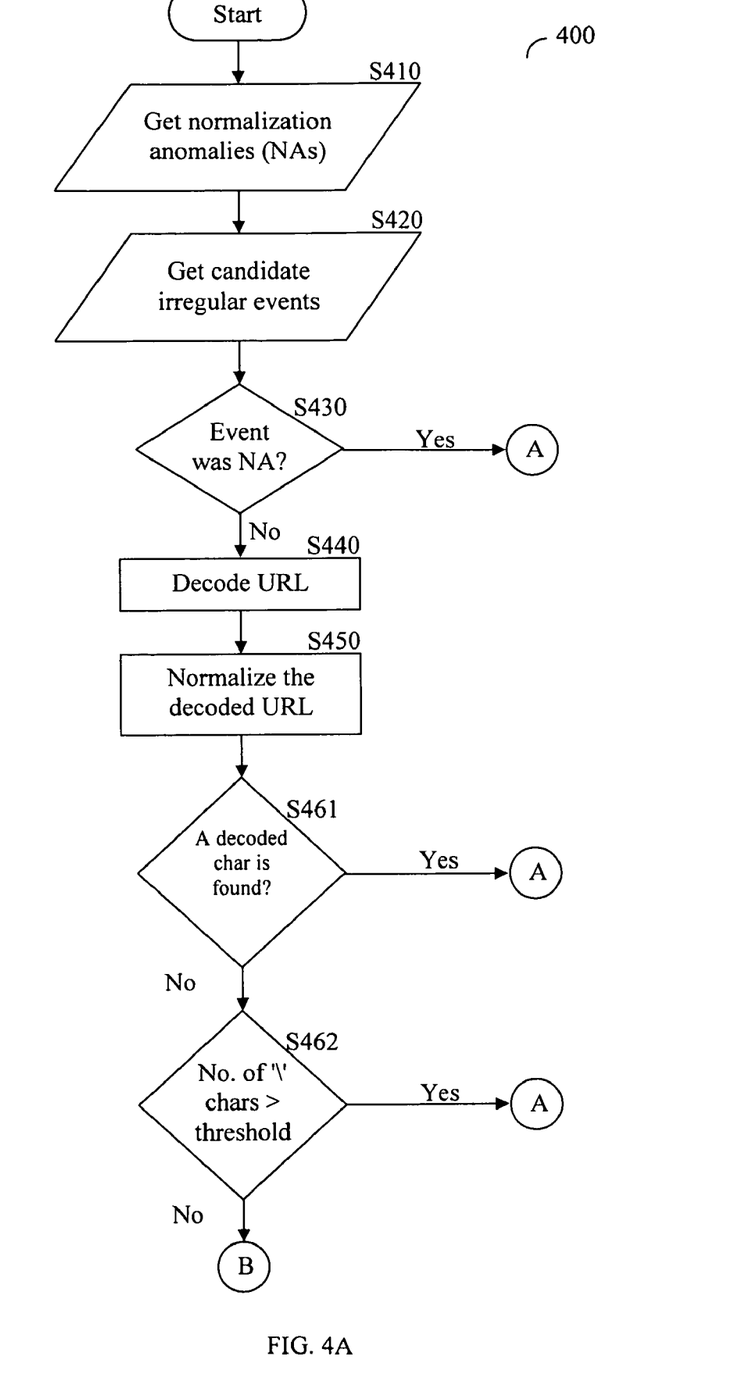
FIG. 4A shows a first portion of an illustrative, non-limiting embodiment of a process for detecting directory traversal attacks.
Figure 4B:
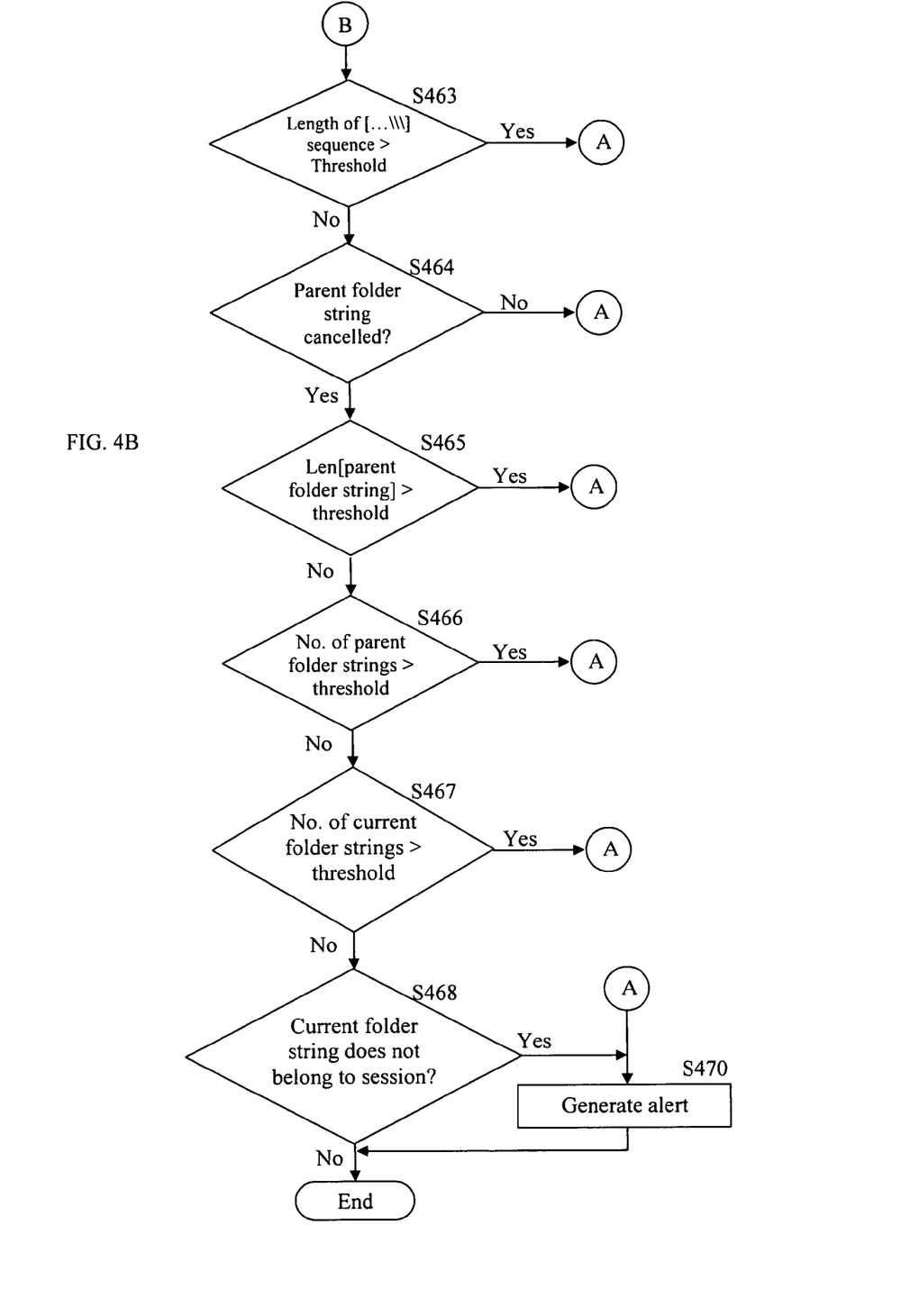
FIG. 4B shows a second portion of an illustrative, non-limiting embodiment of a process for detecting directory traversal attacks.

FIGS. 4A and 4B show an illustrative, non-limiting embodiment of a process 400 that one of the correlation engines 210-1 to 210-N (e.g., engine 210-1) may use to detect directory traversal attacks. These types of attacks encompass a variety of application level attacks that attempt to (1) break the virtual root limitation, (2) abuse privileges given to some folders, (3) bypass access controls, or (4) arbitrarily access files. Generally, directory traversal attacks manipulate URLs by adding additional characters that have a special function in file names. For example, these additional characters may correspond to path separators, current folder indicators, parent folder indicators, etc. In one non-limiting scenario, a web browser generates a valid URL that does not contain any parent folders, current folders, short sequences of repeatable characters (e.g., "//" and " . . . "), or any path separator characters (e.g., '\').

Before the correlation engine 210-1 executes the process 400 in FIGS. 4A and 4B, the network sensor 220 normalizes a URL in an incoming HTTP request. In this normalization procedure, the sensor 220 removes any repeated separators (e.g., "//" and " . . . "), operating system ("OS") separators (e.g., "\"), parent folder strings, current folder strings, and nonstandard folder strings from the URL. Specifically, the sensor 220 (1) replaces the repeated separators (e.g., "//") with a single separator (e.g., "/"), (2) substitutes the OS separators (e.g., "\") with a normal, single separator (e.g., "/"), (3) truncates any parent folder string from the previous part of the path (as indicated with a normal path separator (e.g., "/")), (4) removes any current folder string, and (5) replaces any nonstandard folder string with a single path separator (e.g., "/").

Furthermore, during the normalization procedure, the network sensor 220 may generate a normalization anomaly when (1) a parent folder string cannot be truncated, (2) a nonstandard folder string in the URL has a length that exceeds a predetermined threshold, and (3) a separator character (e.g., "/" and ".") is sequentially repeated more than a predetermined number of times. Also, the sensor 220 may generate an anomaly if the URL has a redundant Unicode transformation format (UTF), has UTF-8 encoding, has a double URL encoding, has an illegal byte code, or has illegal path encoding. Incidentally, the UTF-8 encoding is a byte-oriented encoding form of Unicode.

Once the network sensor 220 performs the above normalization procedure, it outputs an event with one or more anomalies to the correlation engines 210-1 to 210-N, which is configured to detect directory traversal attacks. The sensor also outputs one or more "candidate events" to the engines 210-1 to 210-N. In one implementation, a candidate event is an event that has (1) a URL that required normalization, (2) a redundant UTF-8 anomaly in a URL, (3) a double URL encoding anomaly in a URL, (4) an illegal byte code in a URL anomaly, and/or (5) an illegal path encoding anomaly. Also, instead of supplying the anomalies and candidate events to all of the correlation engines 210-1 to 210-N, the network sensor 220 may supply some or all of this information to just one or some of the engines 210-1 to 210-N. For example, if some of the anomalies and candidate events are only relevant to the attacks that the correlation engines 210-1 and 210-2 detect, the sensor 220 may only supply such information to these engines 210-1 and 210-2.

In any event, the correlation engine 210-1 is configured to detect directory traversal attacks, and it receives the anomalies and candidate events from the network sensor 220. (Operations S410 and S420). Afterwards, the engine 210-1 determines if an event has normalization anomaly. (Operation S430). If the event has such an anomaly (operation S430: Yes), the rule is satisfied, the engine 210-1 considers the event to correspond to a potential attack, and generates an alert (operation S470). If the event does not have a normalization anomaly (operation S430: No), the engine 210-1 decodes the event if it has a redundant UTF-8 anomaly or a double URL and marks any characters resulting from the decoding process. (Operation S440). Then, the correlation engine 210-1 normalizes the decoded URL in accordance with the normalization procedure described above. (Operation S450).

Once the decoded URL is normalized, the engine 210-1 applies a series of rules to the URL to determine if the event containing the URL constitutes a potential attack. (Operations S461 to S468). Specifically, the engine 210-1 determines if, during the normalization procedure in operation S450, it marked a character during the decoding process. (Operation S461). If the engine 210-1 marked a decoded character, it considers the event to be a potential attack (operation S461: Yes) and generates an alert. (Operation 470).

If the engine 210-1 did not process and mark a character (operation S461: No), the engine 210-1 determines if the URL contains more than a predetermined number of successive characters "/." (Operation S462). If so (operation S462: Yes), the engine 210-1 considers the event to be an attack and generates an alert. (Operation S470). If not (operation S462: No), the engine 210-1 determines if the URL contains a predetermined number of sequential characters "." followed by sequential characters "/." (Operation S463). If so (operation S463: Yes), the engine 210-1 considers the event to be an attack and generates an alert. (Operation S470). If not (operation S463: No), the engine 210-1 determines if it is able to cancel parent folder string in the URL. (Operation S464). If not (operation S464: No), the engine 210-1 considers the event to be an attack and generates an alert. (Operation S470). If so (operation S464: Yes), the engine 210-1 determines if the URL contains a parent folder string that is longer than a predetermined length. (Operation S465). If so (operation S465: Yes), the engine 210-1 considers the event to be an attack and generates an alert. (Operation S470). If not (operation S465: No), the engine 210-1 determines if the total number of parent folder strings in the URL exceeds a predetermined amount. (Operation S466). If so (operation S466: Yes), the engine 210-1 considers the event to be an attack and generates an alert. (Operation S470). If not (operation S466: No), the engine 210-1 determines if the total number of current folder strings in the URL exceeds a predetermined amount. (Operation S467). If so (operation S467: Yes), the engine 210-1 considers the event to be an attack and generates an alert. (Operation S470). If not (operation S467: No), the engine 210-1 determines if the URL has a single current folder string that does not belong to a validated session. (Operation S468). If so (operation S468: Yes), the engine 210-1 considers the event to be an attack and generates an alert. (Operation S470). If not (operation S468: No), the engine 210-1 stops processing the information and concludes that the event does not correspond to a potential attack.

Figure 5:
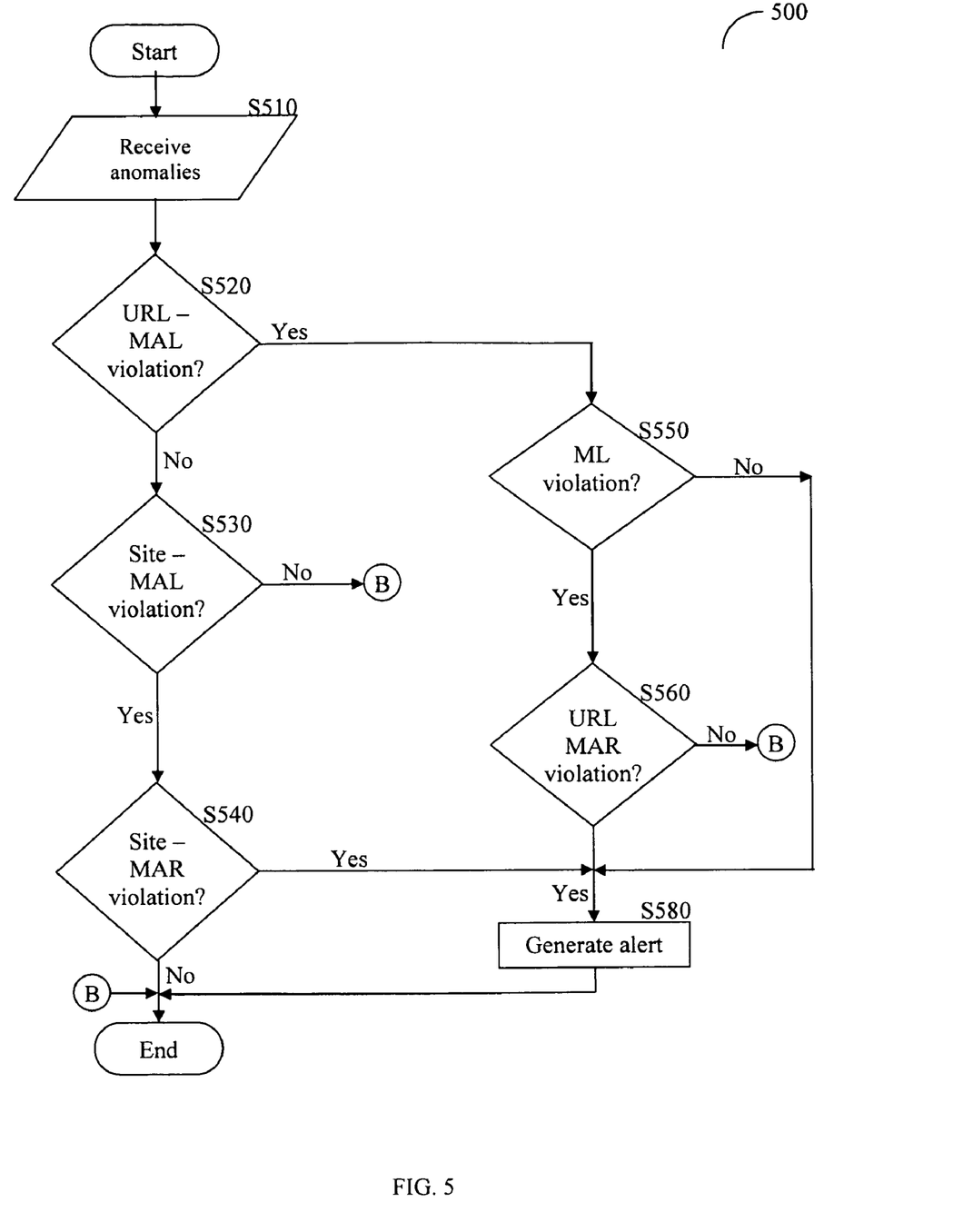
FIG. 5 shows an illustrative, non-limiting embodiment of a processor for detecting denial of service ("DoS") attacks.

FIG. 5 shows an illustrative, non-limiting embodiment of a process 500 that one of the correlation engines 210-1 to 210-N (e.g., engine 210-1) may use to detect DoS attacks. In one implementation, DoS attacks render an application unusable or unreasonably slow for legitimate users by overloading the application resources. DoS attacks include "Rate DoS attacks" and "Resource DoS attacks." A Rate DoS attack floods the application with more requests per second than the application can handle, and thus, the application is extremely slow in processing and responding to requests from other users. A "Resource DoS attack" locks one or more essential resources of the application for a long period of time such that other users cannot use or access the application. To assist the correlation engine 210-1 with detecting DoS attacks, the security system 100 creates a maximal average latency ("MAL") profile, a maximal latency ("ML") profile, and a maximal access rate ("MAR") profile.

The system 100 may determine the MAL profile based on the average HTTP latency for a predetermined period. In one implementation, the average HTTP latency is the average amount of time that the application takes to respond to a request after it receives the request.

As another example, the system 100 may create an MAL profile based on the average HTTP latency of all the responses that the application sent to each URL during predetermined time intervals. This type of MAL profile is referred to as a URL-MAL profile. Also, the system 100 may create an MAL profile by calculating the average HTTP latency of all the responses that the entire site sent during predetermined time intervals. This type of MAL profile is referred to as a Site-MAL profile.

As yet another example, the system 100 may produce an ML profile by determining the maximal latency for a single request that application has experienced for any single URL. Also, the system may determine one type of MAR profile based on the average number of requests sent to a specific URL during predefined time intervals. This type of MAR profile is referred to as a URL-MAR profile. Additionally, the system 100 may create another type of MAR profile based on the number of concurrent TCP connections. This type of MAR profile is referred to as a Site-MAR profile.

After the security system 100 generates the various profiles above, the correlation engine 210-1 receives one or more anomalies. (Operation 510). In this example, the secure gateway 130 generates an anomaly if any of the URL-MAL, Site-MAL, ML, URL-MAR, and Site-MAR profiles is violated.

If the anomaly indicates that the average HTTP latency of all the responses sent to each URL during predetermined time intervals exceeds the maximum average latency in the URL-MAL profile, the engine 210-1 determines that a URL-MAL profile violation has occurred. (Operation S520). In the event of a URL-MAR profile violation (operation S520: Yes), the engine 210-1 determines if the latency for a single request that the application has experienced for any single URL exceeds the maximal latency in the ML profile. (Operation S550).

If so, the correlation engine 210-1 concludes that an ML profile violation has occurred (operation S550: Yes) and generates an alert of a potential attack. (Operation S580). On the other hand, if an ML profile violation has not occurred (operation S550: No), the engine 210-1 determines if the average number of requests sent to a specific URL during a predetermined time interval exceeds the maximum average number of requests in the URL-MAR profile. (Operation S560).

If so, the correlation engine 210-1 concludes that a URL-MAR profile violation has occurred (operation S560: Yes) and generates an alert of a potential attack. (Operation S580). On the other hand, if a URL-MAR profile violation has not occurred (operation S560: No), the engine 210-1 concludes that an attack is not occurring, and the processing ends.

At operation S520, if the correlation engine 210-1 determines that a URL-MAL violation has not occurred (operation S520: No), it determines if the average HTTP latency of all the responses that the entire site sent during predetermined time intervals exceeds the average HTTP latency in the Site-MAL profile. (Operation S530). If so, the engine 210-1 concludes that a Site-MAL profile violation has occurred (operation S530: Yes) and then determines if the number of concurrent TCP connections exceeds the maximum number in the Site-MAR profile. (Operation S540).

If so, the engine 210-1 concludes that a Site-MAR profile violation has occurred (operation S540: Yes) and generates an alert of a potential attack. (Operation S580). On the other hand, if a Site-MAR profile violation has not occurred (operation S540: No), the engine 210-1 concludes that an attack is not occurring and the processing ends. Similarly, at operation S530, if the engine 210-1 determines that a Site-MAL profile violation has not occurred (operation S530: No), concludes that an attack is not occurring and the processing ends.

As described above, the engine determines that an attack is occurring if (1) a URL-MAL profile violation and an ML profile violation occur, (2) a URL-MAL profile violation and a URL-MAR profile violation occur, or (3) a Site-MAL profile violation and a Site-MAR violation occur. Of course, these sets of rules are merely examples, and other combinations of the above rules and/or different rules may be used depending on the particular application and attack.

Illustrative embodiments that detect and DoS and directory traversal attacks have been described above. Of course, as noted above, the present invention is not limited to components and methods for detecting these attacks, and other embodiments will be readily apparent to one skilled in the art upon reading the present application. For example, the correlation engine 210-1 and the method that it performs can be adapted to detect and block other web attacks, including, but not limited to, XSS attacks, automatic reconnaissance attacks, search engine hacking attacks, etc.

The foregoing description of the exemplary embodiments of the invention has been presented for purposes of illustration and description. It is not intended to be exhaustive or to limit the invention to the precise form disclosed, and modifications and variations are possible in light of the above teachings or may be acquired from practice of the invention. The exemplary embodiments were chosen and described in order to explain non-limiting principles of the invention and its practical application to enable one skilled in the art to utilize the invention in various exemplary embodiments and with various modifications as are suited to the particular use contemplated. As such, the invention should cover the full extent of the claimed subject matter and equivalents thereof.

The invention claimed is:

1. A method for detecting application level attacks and for protecting web applications, comprising:
   receiving a plurality of attack indications based on data transmitted on the network, wherein the attack indications are generated in response to violation of at least a plurality of profiles of a protected web application, the attack indications comprise an anomaly, and wherein the anomaly is a deviation from at least a normal behavior profile of a protected web application, the plurality of attack indications being of at least one of a maximal average latency (MAL) profile, a maximal latency (ML) profile, and a maximal access rate (MAR) profile of the protected application;
   iteratively applying a set of correlation rules to correlate the plurality of attack indications by applying a first rule of the set of correlation rules to the attack indications to obtain a first result; and if the first result does not indicate on a potential attack applying a next rule in the set of correlation rules until a result indicating on a potential attack is detected or all rules in the set of correlation rules are applied, wherein the set of correlation rules corresponds to the particular type of an application level attack, to determine if the MAL profile and ML profile are violated, the MAL profile and the MAR profile are violated, or the ML profile and the MAR profile are violated;
   generating an alert if at least one rule of the set of correlation rules applied on the plurality of attack indications indicate that at least a violation occurred;
   wherein the application level attack comprises at least one of a directory traversal attack, a cross site scripting attack, an automatic reconnaissance attack, a search engine hacking attack, and an application denial of service attack.

2. The method of claim 1, wherein the set of correlation rules are independent rules.

3. The method of claim 1, wherein the potential application level attack comprises an attack against a web server executing the web application.

4. The method of claim 1, wherein the potential application level attack comprises an attack against a database server accessed by the web application.

5. The method of claim 1, wherein the attack indications comprise at least one of an irregular event, an anomaly, and an alert.

6. The method of claim 1, wherein the attack indications comprise a first irregular event.

7. The method of claim 6, wherein the first irregular event comprises at least one of an irregular hypertext transfer protocol event and an irregular structured query language event.

8. The method of claim 6, wherein the attack indications comprise anomalies from the first irregular event.

9. The method of claim 6, wherein the attack indications comprise anomalies from a sequence of the first irregular event and at least a second irregular event, and
   wherein the first irregular event and the at least the second irregular event are the same type of events.

10. The method of claim 6, wherein the attack indications comprise the first irregular event and at least a second irregular event, and
    wherein the first irregular event and the at least the second irregular event are different types of events.

11. The method of claim 1, wherein the attack indications further comprise an anomaly, and
    wherein the anomaly comprises a deviation from a signature of an application layer protocol of the data.

12. The method of claim 11, wherein the application layer protocol comprises at least one of a hypertext transfer protocol and a structured query language protocol.

13. The method of claim 1, wherein the rules are applied in an order based on a type of the potential attack to be detected.

14. The method of claim 13, wherein the rules are applied in an order based on a type of the potential application level attack to be detected.

15. A computer program product including a non-transitory computer-readable medium comprising instructions, the instructions being capable of instructing a computer to perform a routine for detecting application level attacks and for protecting web application, wherein the routine comprises:
    receiving a plurality of attack indications based on data transmitted on the network, wherein the attack indications are generated in response to violation of at least a plurality of profiles of a protected web application, the attack indications comprise an anomaly, and wherein the anomaly is a deviation from at least a normal behavior profile of a protected web application, the plurality of attack indications being at least one of a maximal average latency (MAL) profile, a maximal latency (ML) profile, and a maximal access rate (MAR) profile of the protected application;
    iteratively applying a set of correlation rules to correlate the plurality of attack indications by applying a first rule of the set of correlation rules to the attack indications to obtain a first result; and if the first result does not indicate on a potential attack applying a next rule in the set of rules until a result indicating on a potential attack is detected or all rules in the set of correlation rules are applied, wherein the set of correlation rules corresponds to the particular type of an application level attack, to determine if the MAL profile and ML profile are violated, the MAL profile and the MAR profile are violated, or the ML profile and the MAR profile are violated;
    generating an alert if at least one rule of the set of correlation rules applied on the plurality of attack indications indicates that at least a violation occurred;
    wherein the application level attack comprises at least one of a directory traversal attack, a cross site scripting attack, an automatic reconnaissance attack, a search engine hacking attack, and an application denial of service attack.

16. The computer program product of claim 15, wherein the set of correlation rules are independent rules.

17. The computer program product of claim 15, wherein the potential application level attack comprises an attack against a web server executing the web application.

18. The computer program product of claim 15, wherein the application level potential attack comprises an attack against a database server accessed by the web application.

19. The computer program product of claim 15, wherein the attack indications comprise at least one of an irregular event, an anomaly, and an alert.

20. The computer program product of claim 15, wherein the attack indications comprise a first irregular event.

21. The software program of claim 20, wherein the first irregular event comprises at least one of an irregular hypertext transfer protocol event and an irregular structured query language event.

22. The software program of claim 20, wherein the attack indications comprise anomalies from the first irregular event.

23. The software program of claim 20, wherein the attack indications comprise anomalies from a sequence of the first irregular event and at least a second irregular event, and
   wherein the first irregular event and the at least the second irregular event are the same type of events.

24. The software program of claim 20, wherein the attack indications comprise the first irregular event and at least a second irregular event, and
   wherein the first irregular event and the at least the second irregular event are different types of events.

25. The computer program product of claim 15, wherein the attack indications further comprise an anomaly, and
   wherein the anomaly comprises a deviation from a signature of an application layer protocol of the data.

26. The software program of claim 25, wherein the application layer protocol comprises at least one of a hypertext transfer protocol and a structured query language protocol.

27. The computer program product of claim 15, wherein the rules are applied in an order based on a type of the potential attack to be detected.

28. The software program of claim 27, wherein the rules are applied in an order based on a type of the application level potential attack to be detected.

29. A network device in an application level security system for detecting application level attacks, comprising:
   a network sensor that receives data transmitted on the network and that generates a plurality of attack indications based on the data, wherein the attack indications are generated in response to violation of at least a plurality of profiles of a protected web application, the attack indications comprise an anomaly, and wherein the anomaly is a deviation from at least a normal behavior profile of a protected web application; and
   a first correlation engine that applies a first set of correlation rules corresponding to a first type of an application level attack to correlate the plurality of attack indications and that generates a first alert if an application of at least a subset of the first set of correlation rules on the plurality of attack indications indicates a first potential attack;
   the denial of service attack comprising:
   receiving attack indications generated in response to a violation of at least one of a maximal average latency (MAL) profile, a maximal latency (ML) profile, and a maximal access rate (MAR) profile of the protected application;
   iteratively applying a set of correlation rules on the attack indications to determine if the MAL profile and ML profile are violated, the MAL profile and the MAR profile are violated, or the ML profile and the MAR profile are violated; and
   generating the alert on a denial of service attack if one of the violations occurs
   wherein the application level attack comprises at least one of a directory traversal attack, a cross site scripting attack, an automatic reconnaissance attack, a search engine hacking attack, and an application denial of service attack.

30. The device of claim 29, further comprising a second correlation engine that applies a second set of correlation rules corresponding to a second type of an application level attack to correlate the plurality of attack indications and that generates a second alert if an application of at least a subset of the second set of correlation rules on the plurality of attack indications indicates a second potential attack.

31. The device of claim 30, wherein the first correlation engine (1) inputs the second alert from the second correlation engine, (2) applies the first set of correlation rules to the second alert and the plurality of attack indications, and (3) generates the first alert if at least the subset of the first set of correlation rules on the second alert and the plurality of attack indications indicates the first potential attack.

32. The device of claim 29, wherein the first set of correlation rules comprises independent rules.

33. The device of claim 29, wherein the first or the second potential attack comprises an attack against a web server executing the protected web application.

34. The device of claim 29, wherein the first or second potential attack comprises an attack against a database server accessed by the protected web application.

35. The device of claim 29, wherein the attack indications comprise at least one of an irregular event, an anomaly, and an alert.

36. The device of claim 29, wherein the attack indications comprise at least one of an irregular event, an anomaly, and an alert.

37. The device of claim 29, wherein the attack indications comprise a first irregular event.

38. The device of claim 37, wherein the first irregular event comprises at least one of an irregular hypertext transfer protocol event and an irregular structured query language event.

39. The device of claim 37, wherein the attack indications comprise anomalies from the first irregular event.

40. The device of claim 37, wherein the attack indications comprise anomalies from a sequence of the first irregular event and at least a second irregular event, and
   wherein the first irregular event and the at least the second irregular event are the same type of events.

41. The device of claim 37, wherein the attack indications comprise the first irregular event and at least a second irregular event, and
   wherein the first irregular event and the at least the second irregular event are different types of events.

42. The device of claim 29, wherein the attack indications comprise an anomaly, and
   wherein the anomaly comprises a deviation from a normal behavior profile of the data.

43. The device of claim 29, wherein the attack indications further comprise an anomaly, and
   wherein the anomaly comprises a deviation from a signature of an application layer protocol of the data.

44. The device of claim 43, wherein the application layer protocol comprises at least one of a hypertext transfer protocol and a structured query language protocol.

45. The device of claim 29, wherein the first correlation engine applies a first rules of the first set of rules to the plurality of attack indications to obtain a first result, and
   wherein the first correlation engine selectively applies a second rule of the first set of rules to the attack indications based on the first result.

46. The device of claim 45, wherein the rules of the first set of rules are applied in an order based on a type of the first potential attack that the first correlation engine is configured to detect.

47. The device of claim 29, wherein the rules of the first set of rules are applied in an order based on a type of the first potential attack that the first correlation engine is configured to detect.

* * * * *